United States Patent [19]

Suzuki et al.

[11] Patent Number: 5,745,783
[45] Date of Patent: Apr. 28, 1998

[54] SYSTEM FOR RECORDING AND/OR REPRODUCING DATA BY DISCONNECTING THE RECORDING AND/OR REPRODUCING DEVICE FROM THE DATA PROCESSING DEVICE UPON REPRODUCTION OF THE DATA

[75] Inventors: Takatoshi Suzuki, Kawasaki; Satoshi Sakai, Yokohama, both of Japan

[73] Assignee: Canon Kabushiki Kaisha, Tokyo, Japan

[21] Appl. No.: 546,984

[22] Filed: Oct. 23, 1995

[30] Foreign Application Priority Data

Oct. 26, 1994 [JP] Japan .................. 6-262518

[51] Int. Cl.⁶ .................................................. G06F 15/40
[52] U.S. Cl. ................................................................ 395/825
[58] Field of Search .............................. 395/821, 822, 395/823, 825, 826, 114; 360/32; 358/448

[56] References Cited

U.S. PATENT DOCUMENTS

| | | | |
|---|---|---|---|
| 4,321,642 | 3/1982 | Fukuoka | 360/137 |
| 4,803,572 | 2/1989 | Haruna et al. | 360/60 |
| 5,225,904 | 7/1993 | Golin et al. | 348/410 |
| 5,359,427 | 10/1994 | Sato | 386/125 |
| 5,453,787 | 9/1995 | Hancock et al. | 348/391 |
| 5,461,603 | 10/1995 | Otsuka | 369/120 |
| 5,513,011 | 4/1996 | Matsumoto et al. | 386/98 |
| 5,519,808 | 5/1996 | Benton, Jr. et al. | 395/2.79 |
| 5,535,011 | 7/1996 | Yamagami et al. | 386/117 |

*Primary Examiner*—Moustafa M. Meky
*Attorney, Agent, or Firm*—Fitzpatrick, Cella, Harper & Scinto

[57] ABSTRACT

A recording and/or reproducing system includes a data processing unit such as a computer, and a recording and/or reproducing apparatus connected to the data processing unit. The recording and/or reproducing system further includes an image processing unit for processing image data, and a connecting device for disconnecting the recording and/or reproducing apparatus from the data processing unit upon recording and/or reproducing the image data, and connecting the recording and/or reproducing apparatus with the image processing unit.

4 Claims, 5 Drawing Sheets

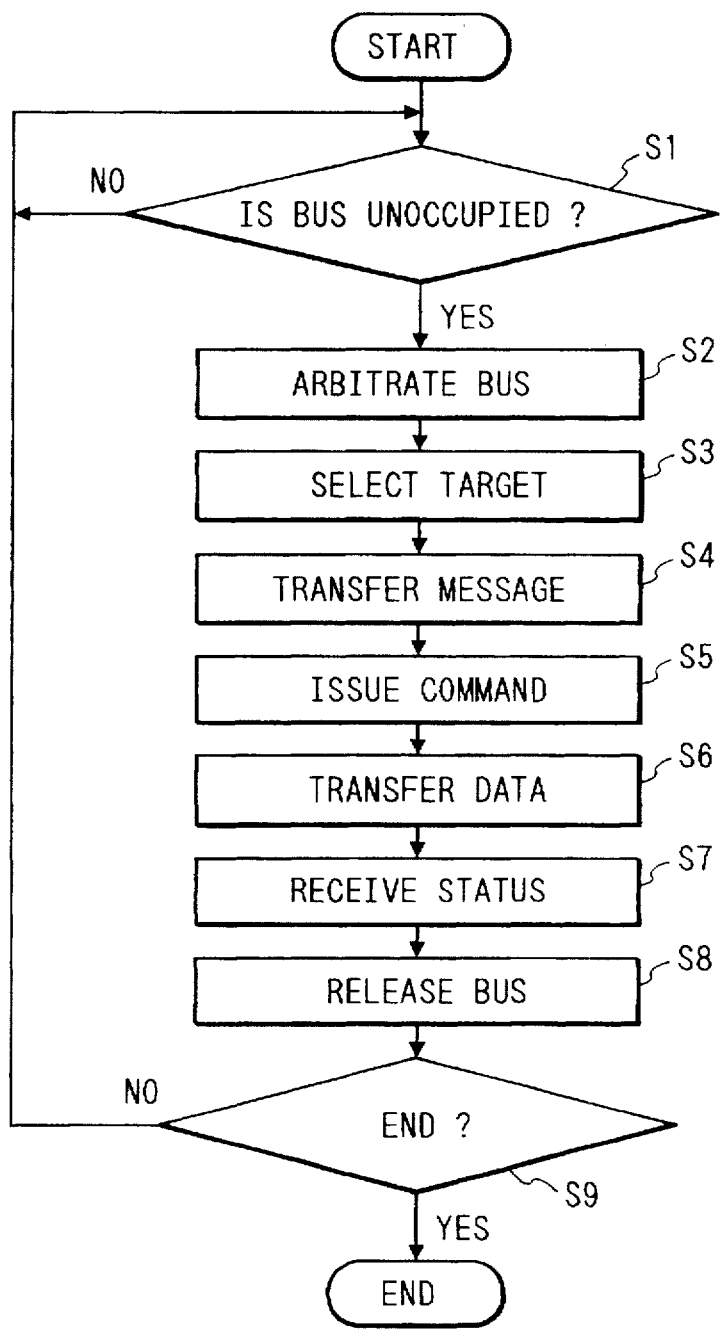

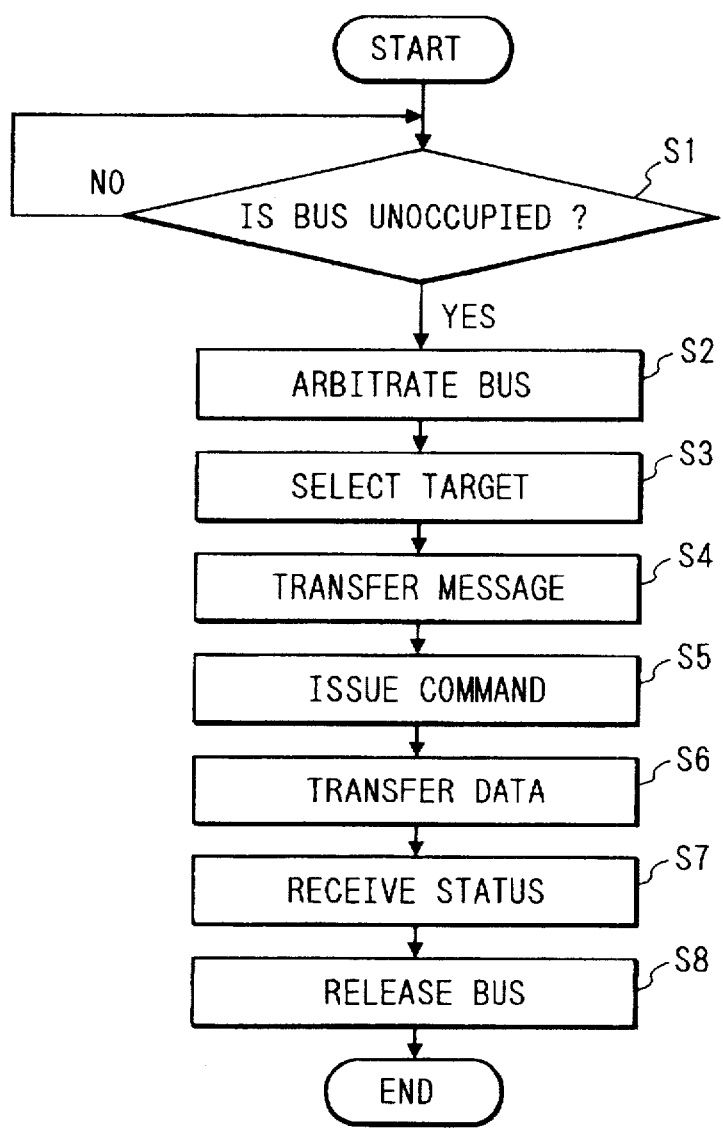

SYSTEM FOR RECORDING AND/OR REPRODUCING DATA BY DISCONNECTING THE RECORDING AND/OR REPRODUCING DEVICE FROM THE DATA PROCESSING DEVICE UPON REPRODUCTION OF THE DATA

BACKGROUND OF THE INVENTION

1. Field of the Invention

The present invention relates to a recording and/or reproducing system for recording and/or reproducing high-speed and large-capacity data, such as dynamic picture data, on a recording medium.

2. Related Background Art

With rapid progress in the semiconductor technology, performance of PC/WS (Personal Computer/Work Station) is quickly being enhanced whereas prices thereof are decreasing these years. Similarly, peripheral devices of PC/WS are also enhancing their performance while decreasing their prices, which is realizing relatively easy processing of dynamic picture on PC/WS. However, presently available systems for recording and/or reproducing high-speed and large-capacity dynamic picture data in real time are very expensive ones comprised of:

(1) PC/WS with high throughput, (2) video capture board (for recording dynamic picture or for recording and/or reproducing dynamic picture) built in PC/WS, (3) large-capacity HDD (Hard Disk) as a recording and/or reproducing apparatus for recording and/or reproducing data at high speed. Thus, it is a present status that price decreases of such systems have not been achieved yet.

The recording and/or reproducing apparatus of this type is connected to PC/WS through a general purpose bus such as a SCSI bus or an IDE (ATA). The video capture board employs the image encoding technique, e.g. Motion JPEG, as a means for lowering a data transfer rate and controlling recording capacity and is realized by a dedicated hardware for recording and/or reproducing data in real time. Namely, such a means is used to supplement the performance of the recording and/or reproducing apparatus.

Incidentally, recording and/or reproduction of dynamic picture in real time may involve various speeds and capacities of recording and/or reproducing data changing depending upon screen size and picture quality. An example is explained herein. First, supposing an NTSC signal desired to record is quantized under conditions of the screen size of 640×480 pixels (corresponding to a 13-inch screen), 8 bits (per pixel) for each of R, G, and B components quantized, and 30 fields per second, the recording speed of data is 27.648 MBytes/sec. When it is compressed to about 1/20 by Motion JPEG, the recording speed becomes 1.3824 MBytes/sec to the recording and/or reproducing apparatus. Here, that recording to satisfy 30 fields per second can be realized when the screen size and quantization bit number are determined to be the above values will be said as that recording without frame missing can be achieved. This is real-time recording of dynamic picture handled by PC/WS.

The progress in the semiconductor technology has already developed LSI etc. that can realize the above values, but the problem is the recording and/or reproducing apparatus for recording the data. No problem will arise as to the recording speed if the recording and/or reproducing apparatus is constructed of a semiconductor disk. However, the recording capacity thereof cannot be set so high, in comparison with the fact that it is very expensive. In contrast, a magnetic disk (HDD) or a magneto-optical disk (MOD) is suitable as a recording and/or reproducing apparatus in respect of the capacity and price, but a bottleneck is the recording and/or reproducing speed. Namely, satisfactory performance for such recording and/or reproducing apparatus is that of the recording and/or reproducing speed realized in recording on a data sheet or the like, but actually available values at present are those some ten percents lower.

FIG. 1 is a schematic structural drawing to show an example of the system for recording and/or reproducing dynamic picture data in real time as described above. In the drawing reference numeral 23 designates PC/WS with high throughput, and 43 a recording and/or reproducing apparatus (HDD). The PC/WS 23 is connected through a SCSI bus 1 to the recording and/or reproducing apparatus (HDD) 43. Reference numeral 25 denotes a video camera for reproducing and/or recording a dynamic picture video signal, 8 a signal line of video-in for connecting PC/WS 23 with the video camera 25 in order to record the dynamic picture video signal, and 15 a signal line of video-out for connecting PC/WS 23 with the video camera 25 in order to reproduce the dynamic picture video signal. The video capture board is built in PC/WS 23.

FIG. 2 is a block diagram to show the detailed setup of the inside of PC/WS 23. In FIG. 2, numeral 27 represents a CPU, 28 a memory (ROM) which stores a program for operation of CPU 27, 29 a memory (RAM) for work used when the CPU 27 executes processing, 30 a bus of CPU 27, 31 a bridge between a PCI bus 32 and the CPU bus 30, for controlling peripheral devices, and 32 the PCI bus for controlling the peripheral devices. Numeral 33 is an interface of a built-in HDD 34, 35 a video monitor board for PC/WS monitor, 36 a signal line for connection to the monitor, 37 the monitor, 38 a video capture board for compressing or expanding dynamic picture, 39 a video-in signal from a video device, 40 a video-out signal to the video device, 41 a SCSI host adapter to which an external recording and/or reproducing apparatus is connected, 42 a SCSI bus signal line, and 43 the recording and/or reproducing apparatus (HDD).

The conventional PC/WS 23 as described above, however, had the problem that it was difficult to fully draw the potential performance of the recording and/or reproducing apparatus (HDD) 43 out, because the CPU 27 inside PC/WS 23 controlled data upon recording data sent from the video capture board 38 into the recording and/or reproducing apparatus 43. The reasons are as follows.

(1) The CPU bus 30 cannot exclusively be occupied for recording, because the CPU 27 inside PC/WS 23 does not control only the recording and/or reproducing apparatus 43.

(2) Transmission of command etc. requires an overhead time for handling data between the CPU 27 inside PC/WS 23 and the recording and/or reproducing apparatus 43.

(3) A further overhead time for handling of command etc. is required because the data is chopped in units of 4 kbytes or 8 kbytes from the constraint of CPU 27 inside PC/WS 23 in spite of an extremely large amount of data to be recorded or reproduced.

(4) A further overhead time is necessary because an access time to the recording and/or reproducing apparatus 43 is some msec to some ten msec.

The reason in item (3) is explained in further detail. FIG. 3 is a flowchart to show the control operation when the CPU 27 records data through the SCSI bus 42 into the recording and/or reproducing apparatus 43. In FIG. 3, for recording data, the CPU 27 first checks whether the SCSI bus 42 is unoccupied (S1), and if the bus 42 is unoccupied, it performs arbitration of bus 42 (S2). Next, the CPU 27 selects the recording and/or reproducing apparatus 43 as a target (S3), transfers an identify massage, for example a logical unit number, to the recording and/or reproducing apparatus (S4), and thereafter issues a recording command of data (S5). Issuing the command, CPU 27 transfers a predetermined amount of data to the recording and/or reproducing apparatus 43 (S6), thereafter receives a status as to whether recording is normally completed, whether a recording error occurs, etc. (S7), frees the SCSI bus 42 after completion of normal recording (S8), and then checks whether the command is entirely completed (S9).

However, the conventional system as described above is arranged to record a large amount of data to be recorded as chopping in units of 4 kBytes or 8 kBytes from the constraint of a filing system which PC/WS 23 has, and therefore, the processing of S1 to S9 needs to be repeated for every recording of the predetermined unit of data. Thus, overhead of S1 to S5 and S7 to S9 is added up, requiring the overhead time as explained in item (3). There is a method for making up for this problem by the cache technique of data in the recording and/or reproducing apparatus 43, but the effect of the cache technique cannot be expected so much in the cases where the amount of recording data is great, for example in the cases of dynamic picture data.

As explained above, the conventional system includes a lot of overhead as explained above in the use of the recording and/or reproducing apparatus with low speed of recording and/or reproduction, such as a magnetic disk apparatus or a magneto-optical disk apparatus, which causes frame-missing of recording image data. Therefore, it was the case that real-time recording of dynamic picture was rarely possible.

SUMMARY OF THE INVENTION

The present invention has been accomplished in view of the above circumstances, and an object of the invention is to provide a recording and/or reproducing system which is arranged to fully draw the performance of the recording and/or reproducing apparatus out and which is capable of recording and/or reproducing even high-speed and large-capacity data, such as dynamic picture data, in real time.

The above object can be achieved by a recording and/or reproducing system comprising data processing means such as a computer, and recording and/or reproducing means connected to the data processing means, which comprises:

image processing means for processing image data; and
connecting means for disconnecting the recording and/or reproducing means from the data processing means upon recording and/or reproducing the image data, and connecting the recording and/or reproducing means with the image processing means.

Further, the above object can also be achieved by a method for recording and/or reproducing image data in a recording and/or reproducing system comprising data processing means such as a computer, recording and/or reproducing means connected to the data processing means, and image processing means for processing the image data, which comprises:

a step of signal-processing the image data by the image processing means; and
a step of transmitting the image data between the image processing means and the recording and/or reproducing means without intervention of the data processing means upon recording and/or reproducing the image data.

The details will be explained in the description of the preferred embodiment which follows.

BRIEF DESCRIPTION OF THE DRAWINGS

FIG. 3 is a flowchart to show the control operation over the recording and/or reproducing apparatus when data is recorded in the recording and/or reproducing apparatus in the system of FIG. 1;

FIG. 6 is a flowchart to show the control operation over the recording and/or reproducing apparatus when image data is recorded in the recording and/or reproducing apparatus of the embodiment of FIG. 4.

DETAILED DESCRIPTION OF THE PREFERRED EMBODIMENT

Figure 1:
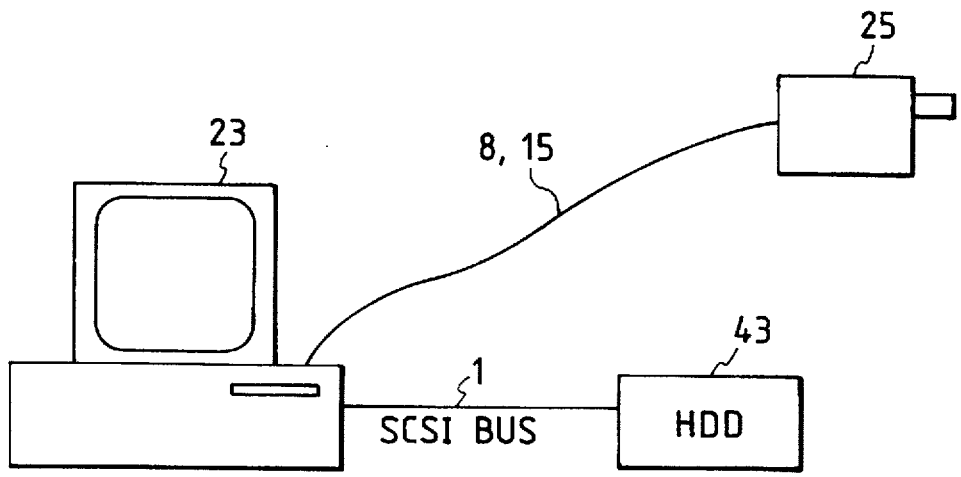
FIG. 1 is a drawing to show a recording and/or reproducing system of a conventional example.
Figure 4:
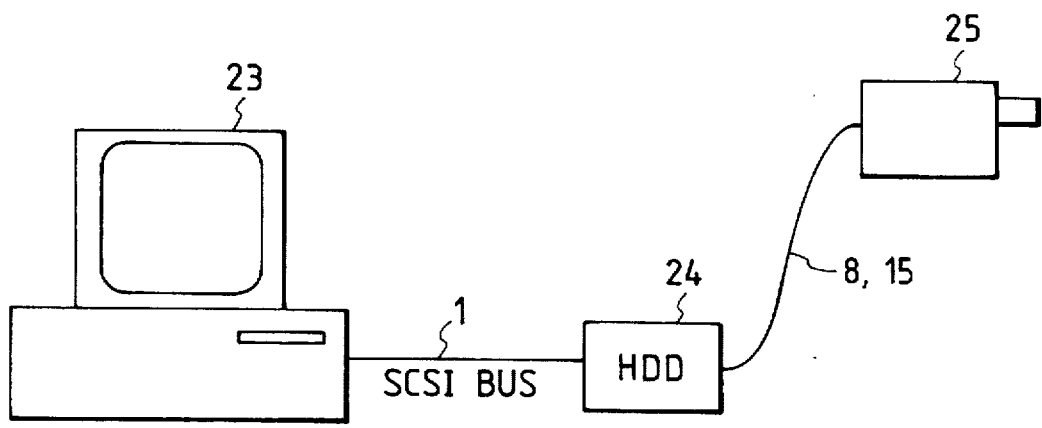
FIG. 4 is a structural drawing to show an embodiment of the recording and/or reproducing system of the present invention.

The embodiment of the present invention will be explained in detail with reference to the drawings. FIG. 4 is a structural drawing to show an embodiment of the recording and/or reproducing system of the present invention. In FIG. 4, reference numeral 23 is a computer which operates under the circumstance of Windows 3.1 in the operation system (OS). This corresponds to PC/WS in FIG. 1. Reference numeral 24 denotes a recording and/or reproducing apparatus capable of recording and/or reproducing dynamic picture data, for example a magnetic disk apparatus (HDD) used herein. The recording and/or reproducing apparatus 24 includes a dynamic picture processing block for compressing or expanding dynamic picture data and a switch block for switching connection of the recording and/or reproducing apparatus 24 from the computer 23 to the dynamic picture processing block, and vice versa, as detailed later, in addition to a drive unit for recording and/or reproducing dynamic picture data. Numeral 25 represents a video camera (having video-in and video-out terminals). Further, numeral 1 denotes a SCSI bus for connecting the computer 23 with the recording and/or reproducing apparatus 24, 8 a video-in signal line for recording the dynamic picture video signal, and 15 a video-out signal line for reproducing the dynamic picture video signal. These video-in signal line 8 and video-out signal line 15 connect the video camera 25 with the dynamic picture processing block in the recording and/or reproducing apparatus 24.

Figure 5:
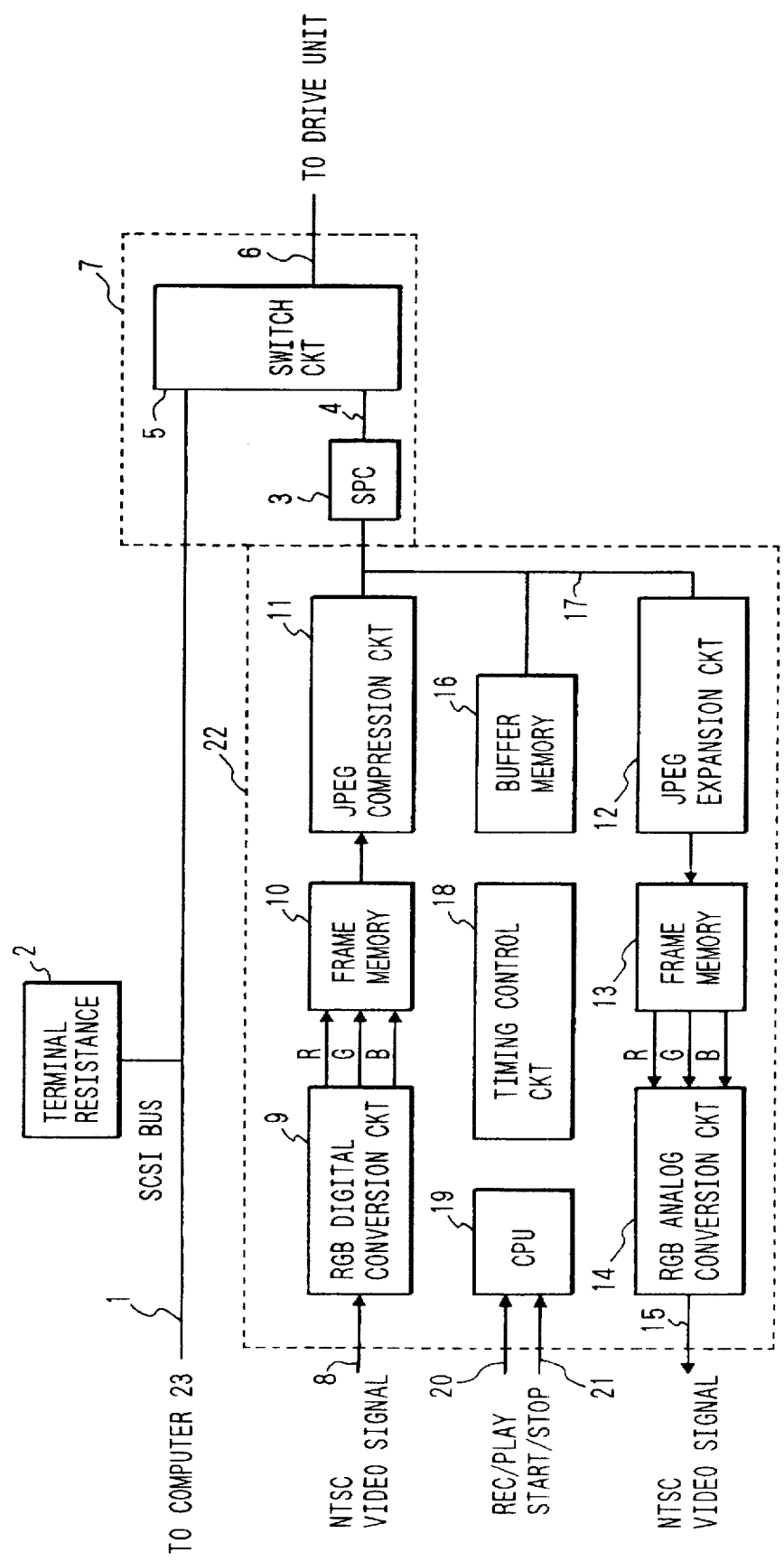
FIG. 5 is a block diagram to show the major setup of the recording and/or reproducing apparatus in the embodiment of FIG. 4.

FIG. 5 is a block diagram to show the recording and/or reproducing apparatus 24. FIG. 5 is illustrated as omitting the setup of the drive unit for recording and/or reproducing the dynamic picture data, which is, for example, the well-known magnetic disk device (HDD) as described above. In FIG. 5, numeral 1 designates the SCSI bus as a host interface for connecting the computer 23 with the recording and/or reproducing apparatus 24, and 2 a terminal resistance connected to the termination of the SCSI bus 1. The SCSI bus 1 is connected to the drive unit in the recording and/or reproducing apparatus 24 through the switch block 7, and the dynamic picture processing block 22 is also connected to the drive unit in the recording and/or reproducing apparatus 24 through the switch block 7. Accordingly, the switching operation of the switch block 7 switches over connection of the drive unit in the recording and/or reproducing apparatus 24 with the computer 23 to that with the dynamic picture processing block 22, and vice versa.

The switch block 7 is composed of SPC (SCSI protocol controller) 3 for controlling recording and/or reproduction of data between the dynamic picture processing block 22 and the recording and/or reproducing apparatus 24, and a switch circuit 5 (manually operated) for selecting either connection of the recording and/or reproducing apparatus 24 with the computer 23 or that with the dynamic picture processing block 22. Further, numeral 4 represents a SCSI bus for connecting the dynamic picture processing block 22 with the recording and/or reproducing apparatus 24, and 6 another SCSI bus for connecting the switch circuit 5 with the recording and/or reproducing apparatus 24.

The dynamic picture processing block 22 is a data processing block for compressing or expanding the dynamic picture data, as described previously. Numeral 8 in the dynamic picture processing block 22 is an NTSC signal coming from a device such as a video camera, 9 is an RGB digital conversion circuit for binarizing the NTSC signal to generate R, G, and B components quantized each in 8 bits, and 10 is a frame memory for storing frame data for image compression processing. Further, numeral 11 denotes a compression circuit for compressing data stored in the frame memory 10 by Motion JPEG, 12 is an expansion circuit for expanding compressed data by Motion JPEG, 13 is a frame memory for storing R, G, and B components of 8 bits expanded, 14 is an RGB analog conversion circuit for converting the R, G, and B data into an analog NTSC signal, and 15 is the NTSC signal sent to the video device.

Numeral 16 designates a buffer memory for storing data when the compressed data is sent to the recording and/or reproducing apparatus 24 and storing compressed data sent from the recording and/or reproducing apparatus 24, 17 is a data bus for connecting the dynamic picture processing block 22 with SPC 3 for performing data control of the recording and/or reproducing apparatus 24, 18 is a timing control circuit for performing timing control of the switch block 7 between the dynamic picture processing block 22 and the SCSI bus 1, 19 is a CPU for controlling the whole of the dynamic picture processing block 22, 20 is a signal from a switch for designating a mode of recording and/or reproduction of dynamic picture signal, and 21 is a signal from a switch for starting or ending recording and/or reproduction of dynamic picture signal.

The specific operation of the above embodiment is next explained. First, the recording operation of a dynamic picture is explained. For recording the dynamic picture, the switch circuit 5 is manually switched to select the SCSI bus 4 of the dynamic picture processing block 22. Then the SCSI bus 4 connects the dynamic picture processing block 22 directly with the recording and/or reproducing apparatus (HDD) 24. The CPU 19 in the dynamic picture processing block 22 recognizes the mode by looking at a port input signal, and then checks whether the signal 20 for designating the recording and/or reproducing mode of dynamic picture is the recording mode. Here, if the recording mode is selected, the CPU awaits the signal 21 from the switch for starting or ending recording and/or reproduction. During that period, the CPU 19 prepares for recording of maximum capacity to the recording and/or reproducing apparatus 24. Namely, the CPU moves a recording and/or reproducing head in the recording and/or reproducing apparatus 24 to a recording start position to keep it in a wait state, and prepares to set a value corresponding to the maximum capacity to be recorded as a parameter of command.

When the switch for starting or ending recording and/or reproduction is depressed to send the signal 21 for designating start of recording and/or reproduction, the timing control circuit 18 starts operating to take the NTSC video signal 8 into the RGB digital conversion circuit 9 in accordance with a timing signal thereof, to quantize the video signal into 8-bit data of R, G, and B components inside the RGB digital conversion circuit 9, and to write the data in the frame memory 10. After a constant amount of data is written, the data is compressed by the JPEG compression circuit 11. A result of compression is written in the buffer memory 16. The CPU 19 monitors an amount written, and with storage of a certain constant amount, the CPU issues to the recording and/or reproducing apparatus 24 a command to execute writing of the maximum capacity to be recorded, which is already obtained. The recording and/or reproducing apparatus 24 then starts writing data according to the command.

FIG. 6 is the flowchart to show the control operation in performing the writing of data. The control of the writing of data is carried out through the SPC 3 under management of CPU 19 in the dynamic picture processing block 22. Since S1 to S8 in FIG. 6 are the same as S1 to S8 in FIG. 3, the detailed description thereof is omitted herein. It is, however, noted that the present embodiment is so arranged that, for recording in the recording and/or reproducing apparatus 24, the recording and/or reproducing apparatus 24 is separated from the computer 23 and the dynamic picture processing block 22 is connected with the recording and/or reproducing apparatus 24, whereby the recording and/or reproducing apparatus 24 can be placed not under management of the computer 23, but under management of the dynamic picture processing block 22. Accordingly, the present embodiment is free from the constraint of the filing system of PC/WS, and thus, the data does not have to be written in the chopped form. Therefore, the present embodiment can exclude the overhead time due to handling of command etc. as listed in item (3). Namely, data does not have to be chopped for recording thereof, which can thus obviate the need to repeat the processing of S1 to S8 in FIG. 6, thereby omitting the overhead of S1 to S5 and S7 to S9.

In the case of the writing data being desired to monitor, the recording data stored in the buffer memory 16 is also sent to the JPEG expansion circuit 12, the expanded result is written in the frame buffer 13, the data is sequentially sent to the RGB analog conversion circuit 14 to change the data into the video signal, and the video signal is sent to the video device 25 to monitor it. When the writing of maximum capacity to be recorded is completed, the operation is ended at that point. When the switch for starting or ending recording and/or reproduction is depressed on the way to stop recording with the signal 21 from the switch, the operation is forced to be ended. In that case, the capacity used for recording is obtained. Then data indicating recording start/ end addresses of data is written in a predetermined region of the recording and/or reproducing apparatus 24, thereafter ending the recording operation.

For reproducing the dynamic picture, the SCSI bus 4 of the dynamic picture processing block 22 is selected by the switch circuit 5 in the same manner as upon recording, thereby directly connecting the dynamic picture processing block 22 with the recording and/or reproducing apparatus 24 through the SCSI bus 4. The CPU 19 in the dynamic picture processing block 22 recognizes this mode by looking at a port input signal and then checks whether the reproducing mode is selected, by the signal 20 from the mode switch.

Here, when the reproducing mode is selected, the CPU awaits depression of the switch for starting or ending recording and/or reproduction. During that period the CPU 19 takes data indicating the recording start/end addresses of data written in the predetermined region in the recording and/or reproducing apparatus 24, prepares to set the capacity of the reproducing data as a parameter of command, and moves the recording and/or reproducing head to a reproduction start position to keep it in a wait state.

When the switch for starting or ending recording and/or reproduction is depressed in this state and the signal 21 from the switch is sent, the timing control circuit 18 starts operating, and the reproducing data is taken from the recording and/or reproducing apparatus 24 into the buffer memory 16 in accordance with the timing signal. After taking the certain constant amount of data, the reproducing data is sent to the JPEG expansion circuit 12 to expand the data. Then the data expanded is written in the frame memory 13, the data is sequentially sent to the RGB analog conversion circuit 14 to convert the data into a video signal, and the video signal is sent to the video device 25, thus reproducing a sequence of dynamic pictures. When reproduction of the maximum capacity is completed, the operation is ended at that point. When the switch for starting or ending recording and/or reproduction is depressed on the way, the operation is forced to end at that point.

Next explained is the operation for reproducing the dynamic picture data recorded, by the computer 23. In this case, the SCSI bus 1 on the side of computer 23 is selected by the switch circuit 5 to directly connect the computer 23 with the recording and/or reproducing apparatus 24 through the SCSI bus 1. On the computer 23 a dedicated program is operated to make access to the recording and/or reproducing apparatus 24 by a SCSI command in the same manner as that to normal recording and/or reproducing apparatus. By this, the dynamic picture can be reproduced on the computer 23. It is, however, noted in this case that there are some cases where the dynamic picture cannot be reproduced in real time. In such cases, reproduction of dynamic picture in real time can become possible by arbitrarily demagnifying the screen size or decreasing the number of frames per second. Further, the system may be so modified that the computer 23 performs communication with the recording and/or reproducing apparatus 24 to determine optimum screen size and number of reproducing frames per second and then reproduces the dynamic picture.

Figure 2:
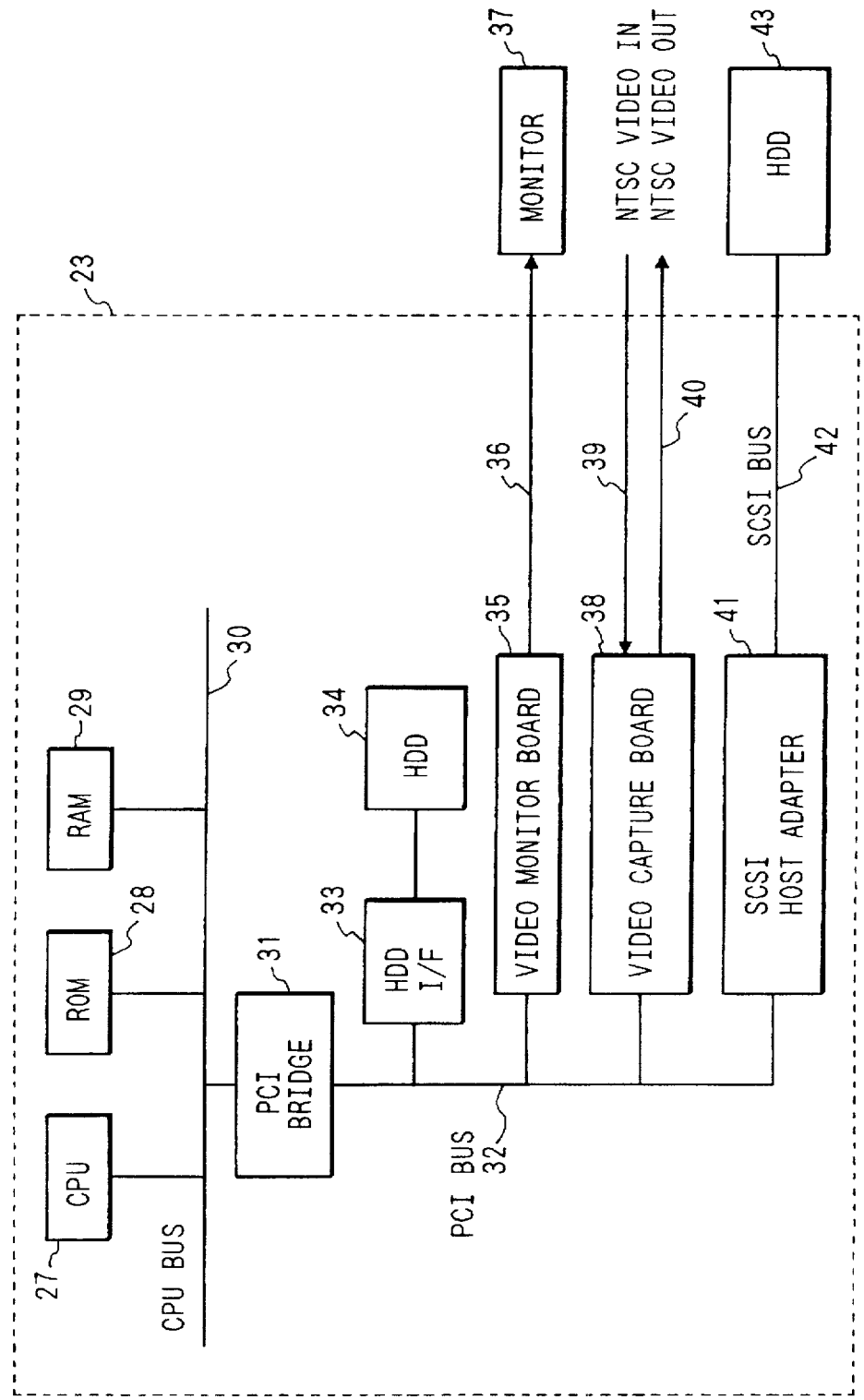
FIG. 2 is a block diagram to show the internal setup of PC/WS in the system of FIG. 1.

Further, processing and editing of data recorded in the recording and/or reproducing apparatus 24 is carried out as follows. Similarly as in reproducing the dynamic picture data recorded, by the computer 23, the data recorded in the recording and/or reproducing apparatus 24 is converted into one in a file format on computer 23 by the dedicated program on the computer 23 and then the data is processed or edited by the general purpose program on the computer 23. The data is recorded in the HDD 34 built in the computer 23, as shown in FIG. 2.

Further, for recording and/or reproducing the dynamic picture data produced on the computer 23 in the recording and/or reproducing apparatus 24, the SCSI bus 1 on the side of computer 23 is selected by the switch circuit 5 in the switch block 7 to directly connect the computer 23 with the recording and/or reproducing apparatus 24 through the SCSI bus 1. Then the dynamic picture data produced by the computer 23 is converted into one in the format of the recording and/or reproducing apparatus 24 by the dedicated program, and the converted data is recorded. Further, for reproducing the data, the operation is the same as the reproducing operation of dynamic picture as described above.

It is noted here that, for recording the dynamic picture data in the recording and/or reproducing apparatus 24, the data may be recorded according to the file format on the computer 23. In this case, no dedicated program operating on the computer 23 is necessary when the computer 23 makes access to the recording and/or reproducing apparatus 24. In addition, the recording and/or reproducing apparatus 24 may be a removable HDD or MOD, or an MOD provided with an autochanger function. Further, the switch circuit 5 does not always have to be manually operated, but may be electrically controlled.

As explained above, the present invention includes the arrangement in which the recording and/or reproducing apparatus as a peripheral device of the computer is separated from the computer upon performing recording and/or reproducing the dynamic picture data, i.e., large-capacity data and is connected with the image processing apparatus, whereby the overhead time, mostly occurring under management of the computer, can be greatly decreased and the recording and/or reproducing apparatus can fully deliver its performance. Accordingly, recording and/or reproduction becomes possible independently of the performance of the computer, and, even with use of an apparatus with slow recording and/or reproducing speed, such as a magnetic disk apparatus or a magneto-optical disk apparatus, high-speed and large-capacity data, such as dynamic picture, can be recorded and/or reproduced in real time. When the data recorded is reproduced by the computer, the data can be reproduced in accordance with the performance of the computer.

What is claimed is:

1. A recording and/or reproducing system comprising data processing means of a computer, and recording and/or reproducing means connected to the data processing means, said system comprising:

image processing means for processing image data; and connecting means for disconnecting the recording and/or reproducing means from the data processing means upon reproduction of the image data, and for connecting the recording and/or reproducing means with said image processing means.

2. The recording and/or reproducing system according to claim 1, wherein said image processing means comprises compressing and expanding circuits for compressing and expanding the image data.

3. The recording and/or reproducing system according to claim 1, wherein the data processing means comprises means for converting a file format of the image data recorded by the recording and/or reproducing means into a file format capable of being reproduced by the data processing means.

4. A method for reproducing image data in a recording and/or reproducing system comprising data processing means of a computer, recording and/or reproducing means connected to the data processing means, and image processing means for processing the image data, said method comprising:

signal-processing image data by the image processing means; and transmitting the image data between the image processing means and the recording and/or reproducing means without intervention of the data processing means upon reproduction of the image data.

* * * * *